May 5, 1970 M. L. RICE ET AL 3,509,822

PROPELLENT GRAINS

Filed June 9, 1960 8 Sheets-Sheet 1

INVENTORS
MILLARD LEE RICE,
JOE M. BURTON and
ROBERT G. SHAVER

BY Martha L. Ross
AGENT

INVENTORS
MILLARD LEE RICE,
JOE M. BURTON, and
ROBERT G. SHAVER
BY Martha L. Ross
AGENT May 5, 1970 M. L. RICE ET AL 3,509,822

PROPELLENT GRAINS

Filed June 9, 1960 8 Sheets-Sheet 3

INVENTORS
MILLARD LEE RICE,
JOE M. BURTON, and
ROBERT G. SHAVER

BY Martha L. Ross
AGENT

PROPELLENT GRAINS

Filed June 9, 1960 8 Sheets-Sheet 4

INVENTORS
MILLARD LEE RICE,
JOE M. BURTON and
ROBERT G. SHAVER

BY Martha L. Ross
AGENT

INVENTORS
MILLARD LEE RICE,
JOE M. BURTON and
ROBERT G. SHAVER
BY Martha L. Rose
AGENT

PROPELLENT GRAINS

Filed June 9, 1960 8 Sheets-Sheet 6

INVENTORS
MILLARD LEE RICE,
JOE M. BURTON and
ROBERT G. SHAVER
BY Martha L. Ross
AGENT

PROPELLENT GRAINS

Filed June 9, 1960 8 Sheets-Sheet 7

INVENTORS
MILLARD LEE RICE,
JOE M. BURTON and
ROBERT G. SHAVER

BY Martha L. Ross
AGENT

Fig. 30.
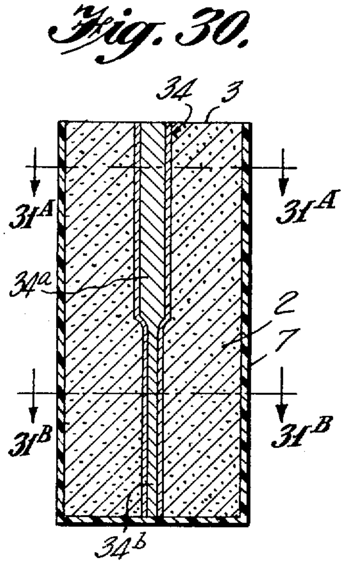
Fig. 31.
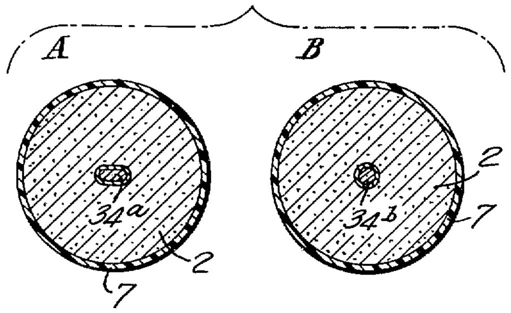
Fig. 32.
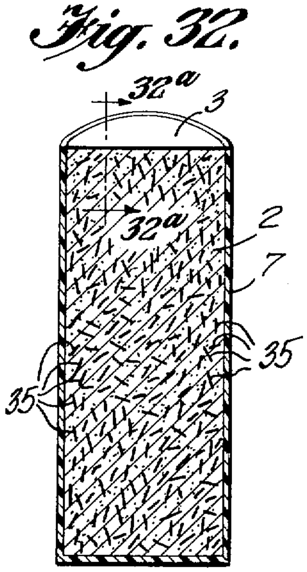
Fig. 33.
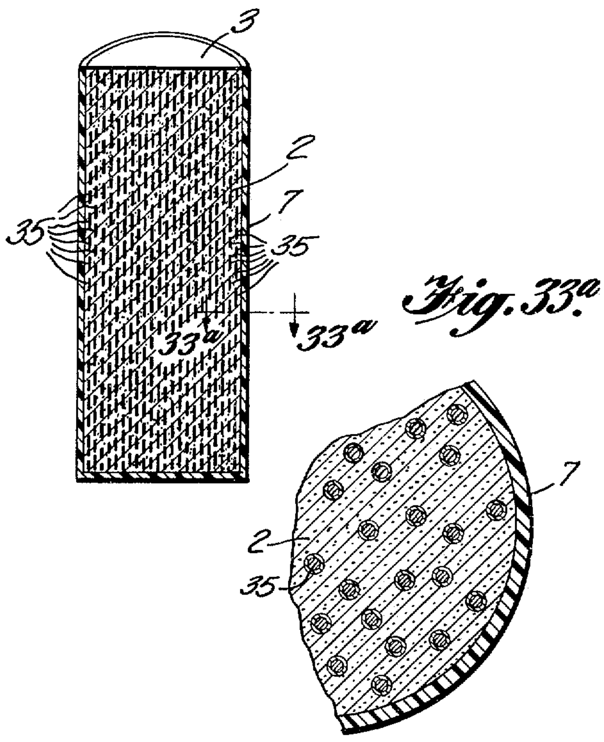
Fig. 33, Fig. 33a
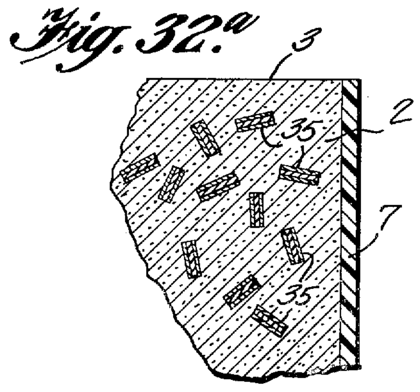
Fig. 32a
INVENTORS
MILLARD LEE RICE,
JOE M. BURTON and
ROBERT G. SHAVER
BY Martha L. Ross
AGENT

United States Patent Office 3,509,822
Patented May 5, 1970

3,509,822
PROPELLENT GRAINS

Millard Lee Rice, Annandale, Joe M. Burton, Alexandria, and Robert G. Shaver, Burke, Va., assignors to The Susquehanna Corporation, a corporation of Delaware Filed June 9, 1960, Ser. No. 35,088
Int. Cl. F42b *1/00*
U.S. Cl. 102—102 25 Claims This invention relates to new and improved propellent grains having greatly increased effective burning rates.

There is an ever growing requirement, particularly in the field of rocketry, for the development of propellent grains which provide increased propulsive performance. As is well-known in the art, there are numerous factors which affect propellent performance, such as the propellent composition, its linear burning rate, its ambient temperature, combustion chamber pressure and the like. One of the important parameters determining thrust in the case of shaped propellent grains, which are loaded into and burned directly in the combustion chamber of the rocket motor, is the burning surface area, since this is one of the essential factors in determining the mass rate of gas generation. The rate of generation of propulsive gases, other factors being equal, is proportional to the product of the propellent burning rate and the burning surface area.

Conventional end-burning grains, despite their many important advantages as compared with perforated grains and shaped, laterally burning grains, such as high strength and loading density, and freedom from the erosive effect of high velocity combustion gases, have too small a burning surface area to provide the high rate of gas generation generally required for high performance. Propellent grains containing elongated metal heat conductors such as wires embedded in intimate, gas-sealing contact with the propellent matrix have recently been introduced to the art. The embedded metal heat conductors effect a large increase in burning surface area and, thereby, the mass burning rate and mass rate of gas generation to such a considerable degree as to bring end-burning grains within the realm of high performance. The increased burning surface area of the grains containing the embedded metal heat conductors results from the fact that the propellent matrix burns along the metal at a much higher rate than its normal linear burning rate, thereby producing recessing of the burning surface with the metal conductor at the apex of the formed recess.

By selection of a metal of optimum heat conductivity, such as silver, increases in effective or mass burning rate as high as five-fold can be obtained. Still higher mass burning rates can be obtained by coating the metal heat conductor with a self-oxidant coating having a higher linear burning rate than that of the propellent matrix. This expedient, though effective, requires additional and exacting operational steps, such as proper formulation of the coating composition, application, and bonding of the composition to the metal.

The ever increasing altitudes at which rocket-propelled devices now range, is making operation at lower combustion chamber pressures both feasible and desirable. It is essential, however, that the burning rate of the propellent remain high despite the lower pressures. It is well known in the art that the burning rate of a propellant generally increases with increasing combustion chamber pressure. The relationship between change in pressure and change in burning rate is defined by the pressure exponent, which varies with the particular propellent composition and may also vary over different ranges of pressure. The higher the pressure exponent, the greater is the increase in burning rate with increasing pressure. Conversely, the lower the chamber pressure, the lower is the burning rate. Also, the larger the pressure exponent, the more sensitive is the propellant to fluctuations in pressure. Excessive sensitivity obviously can pose serious hazards and control difficulties.

The operating pressures in high performance rockets has generally been about 1000 p.s.i.a. or above, and a propellant which performs well at these high pressures is acceptable. Many such propellants, however, burn excessively slowly at relatively low pressures, such as about 100 to 300 p.s.i.a., or may not even burn at all.

The object of this invention is to provide propellant grains of greatly increased effective burning rate.

Still another object is to provide propellent grains having exceedingly high effective burning rates over a wide range of operating pressures, including relatively low pressures.

Another object is to provide propellent grains of low sensitivity to variation in combustion chamber pressure over a wide range of pressure.

Still another object is to provide propellent grains which can be modulated to provide prescheduled, controlled changes in mass rate of gas generation and thrust during their burning cycles.

Still other objects and advantages will become obvious from the following detailed description and the drawings.

In the drawings, in which like numerals denote like parts:

FIG. 1 comprises a diagrammatic series of longitudinal sectional views through a rocket motor showing a propellent grain in the combustion chamber and the effect of a longitudinally embedded exothermic metal wire on the burning characteristics of the end-burning charge.

Figure 14:
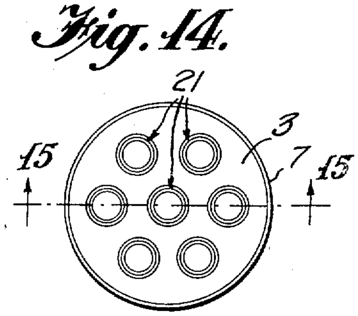
FIG. 14 is a plan view showing a bundle of tubular exothermic metal members embedded in a propellent grain.
Figure 15:
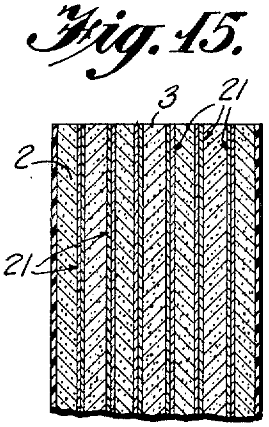

FIG. 15 as a cross-sectional view taken along lines 15—15 of FIG. 14.

Figure 16:
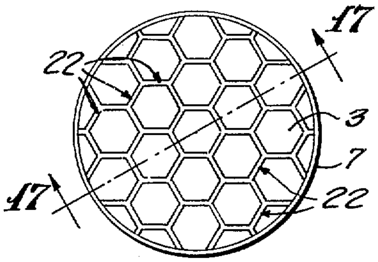
Figure 16:
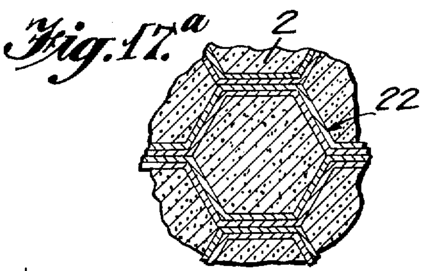

FIG. 16 is a plan view showing an exothermic metal member in the form of a honeycomb embedded in a propellent grain.

Figure 17:
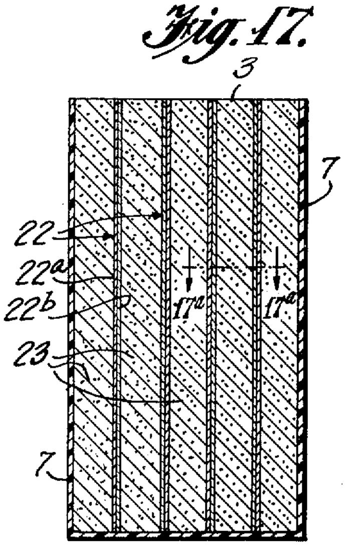

FIG. 17 is a cross-sectional view taken along lines 17—17 of FIGURE 16.

FIG. 17A is an enlarged fragmentary sectional view taken on lines 17A—17A of FIGURE 17.

Figure 18:
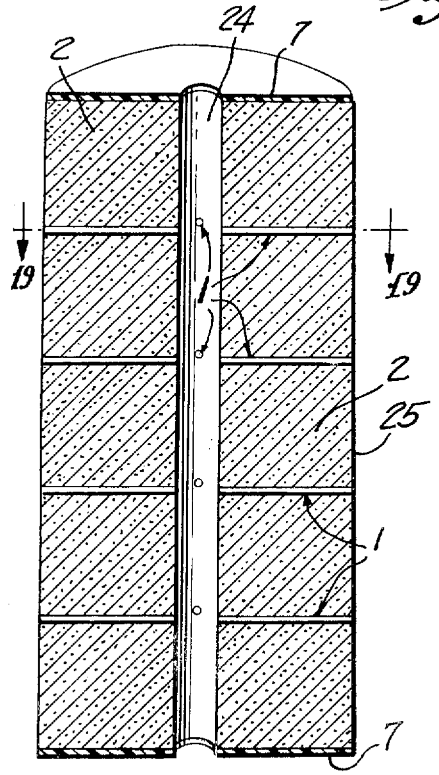

FIG. 18 is a sectional perspective of a perforated grain containing radially-disposed exothermic wires.

Figure 19:
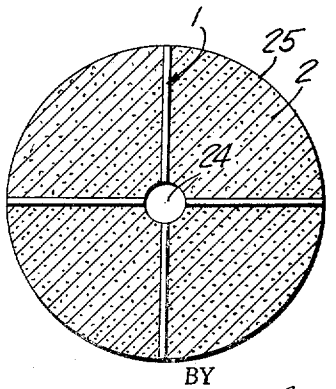

FIG. 19 is a cross-section taken along lines 19—19 of FIG. 18.

Figures 20, 21, 22, 23:
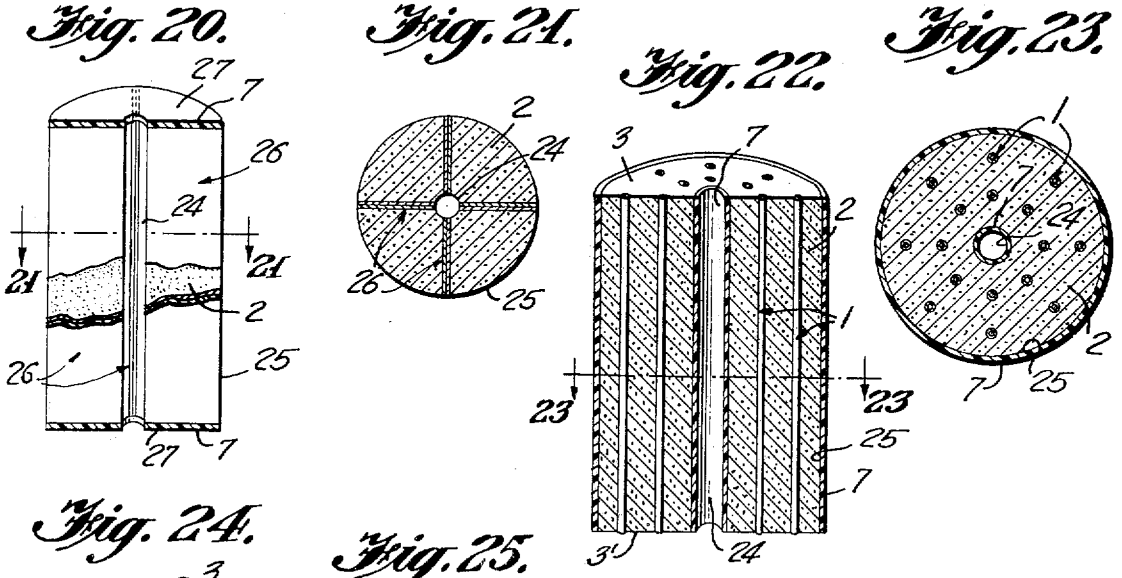

FIG. 20 is a sectional perspective of a perforated gain containing radially disposed exothermic metal strips.

FIG. 21 is a cross-section along lines 21—21 of FIG. 20.

FIG. 22 is a sectional perspective of a perforated grain with longitudinally disposed continuous exothermic metal wires.

FIG. 23 is a cross-section taken along lines 23—23 of FIG. 22.

Figure 24:
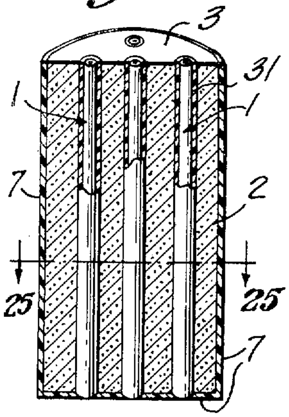

FIG. 24 is a sectional perspective of an end-burning grain containing coated exothermic metal wires.

Figure 25:
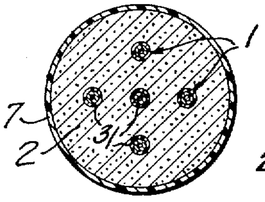

FIG. 25 is a cross-section taken along lines 25—25 of FIG. 24.

Figure 26:
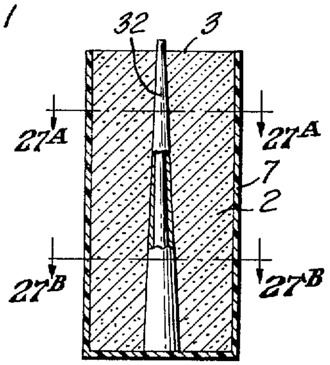

FIG. 26 is a longitudinal section of a propellent grain containing an elongated exothermic wire of varying ratio of cross-sectional area to perimeter along its length.

Figure 27:
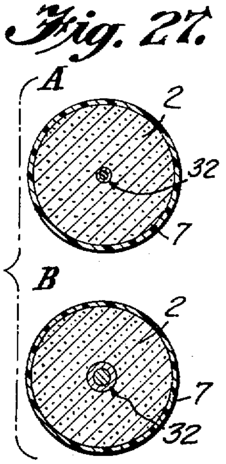

FIG. 27 comprises two cross-sectional views taken at 27A—27A and 27B—27B of FIG. 26.

Figure 28:
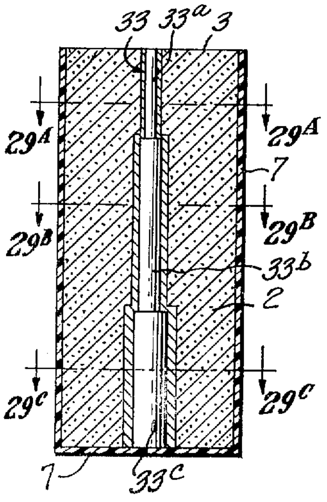

FIG. 28 is a longitudinal sectional view showing a modification.

Figure 29:
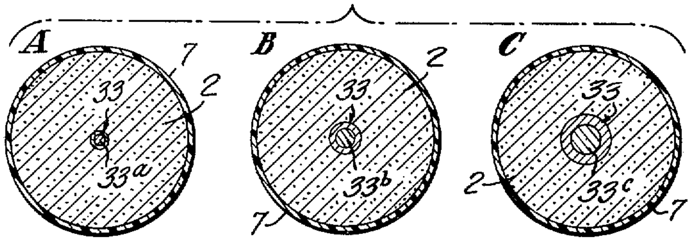

FIG. 29 is a series of cross-sectional views taken respectively at 29A—29A, 29B—29B, and 29C—29C of FIG. 28.

FIG. 30 is a longitudinal sectional view showing still another modification.

FIG. 31 is a series of cross-sectional views taken at 31A—31A and 31B—31B of FIG. 30.

FIG. 32 is a sectional perspective of an end-burning grain showing a random dispersion of short lengths of exothermic metal wire.

FIG. 32A is an enlarged, detailed, fragmentary sectional view along lines 32A—32A of FIG. 32.

FIG. 33 is a sectional perspective of an end-burning grain showing short lengths of longitudinally oriented exothermic metal wire.

FIG. 33A is an enlarged, detailed, fragmentary section along lines 33A—33A of FIG. 33.

We have found that effective or mass burning rate can be greatly increased by embedding in a propellent grain in intimate, gas-sealing contact with the matrix, an elongated metal member comprising at least two metals in intimate contact, which, upon heating, generally to a temperature approaching the melting point of the lower melting metal, react exothermically. When one end of such an elongated metallic member is brought to the temperature requisite to initiate reaction, the exothermic alloying reaction proceeds progressively and rapidly down the entire length of the structure so long as the heat of reaction is not dissipated so rapidly as to reduce the temperature of the embedded metal member below reaction temperature.

There are a number of metal combinations which, upon heating, react exothermically with such large heat evolution as to produce temperatures as high as 2500° C. or higher. Platinum and palladium, which for convenience will be termed Group A, for example, react in this manner with metals such as aluminum, magnesium, and zinc, which will be termed Group B. One or more of the metals in each group can be employed in making the elongated metallic member. Other exothermically alloying metal combinations include:

| Group A | Group B |
|---|---|
| Al | Co, Fe, Ni, Sb, Ca, Cu, La, Li, Pr, Ti, Ce |
| Ni | Sn, Si |
| Mg | Ce, Al, Pr, La, Pb, Sn, Si |
| Si | Fe, Co |
| Zn | Ag, Cu |

The metals participating in the exothermic reaction must, as aforementioned, be in intimate contact with each other. This can be accomplished in any suitable manner as, for example, by cladding one metal with the other, one metal, thereby, forming the sheath and the other the core; by joining strips of the metals together, as by welding or soldering; by electroplating one of the metals on to the other; by compression molding a particulate mixture of the metals; and the like. One precaution which must, of course, be followed is the avoidance of temperature high enough to induce reaction.

The exothermic alloying occurs over a wide range of proportion of the metals relative to each other. The intensity of reaction varies with the particular proportions of a particular combination of metals. The optimum range of proportion varies, of course, with different reacting metal combinations. In general, the optimum ratio for greatest exotherm is that approaching the equivalent weights of the reacting metals in the alloy compound formed. In any case, it is essential only to have the metals present in relative amounts sufficient for reaction. This, as pointed out above, varies with the particular metals used and can readily be determined by routine experimentation and by calculation from information available in published literature. In the case of Pd-Al combinations, for example, it is desirable to have a minimum ratio of 20 parts by volume of one reacting metal to 80 parts by volume of the other reacting metal.

The elongated metallic member aforedescribed can be dispersed in the propellent matrix in the form of short wires or filaments, a substantial number of which must be at an angle substantially less than 180° relative to the initial ignition surface of the propellent grain; or in the form of a continuous element positioned substantially normal to the initial ignition surface and longitudinally disposed in the direction of flame propagation of the grain.

Figure 1:
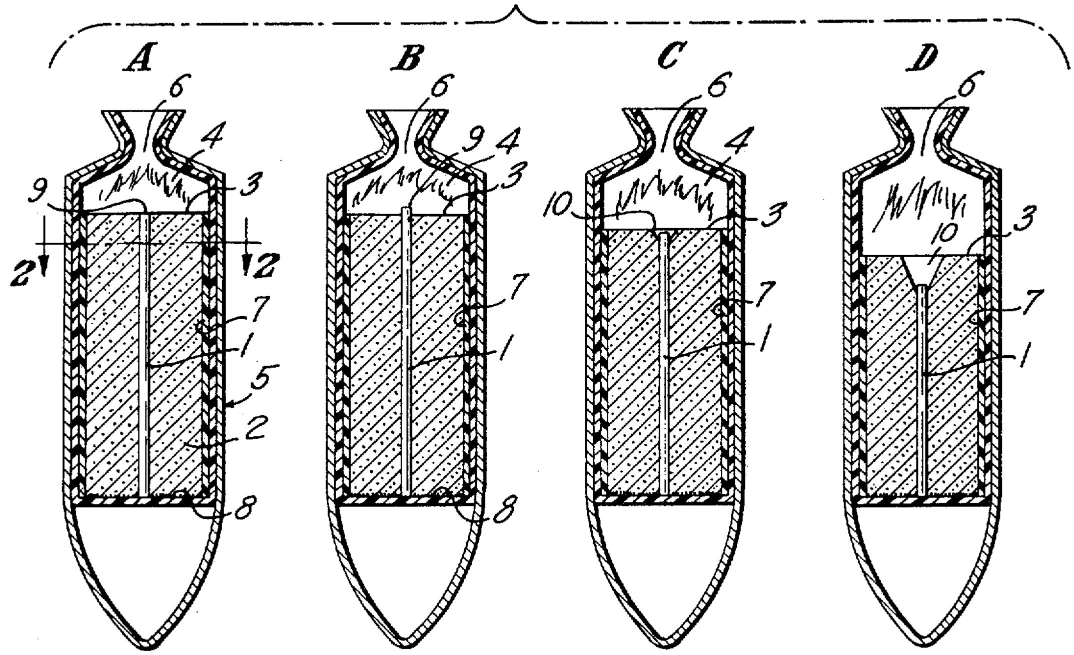

The exothermically reactive metallic member functions to increase mass burning rate of the grain substantially as follows:

The propellent grain, after ignition of its initial ignition surface, burns to produce high temperature combustion gases. The high temperature gases heat an exposed end of the metallic member to its reaction temperature. This exothermic reaction then proceeds progressively along its length. The heat produced by the reaction occurring in the metallic member is communicated to the propellent matrix directly adjacent to the metal, so that the burning surface of the propellant in that area propagates very rapidly along the metal, thereby forming a deep recess, which is substantially V-shaped, with the metal at the apex of the recess, as shown in FIG. 1. The recess greatly increases burning surface area and, thereby, mass burning rate, mass rate of gas generation, and thrust.

The elongated metal member can be employed in a large variety of shapes. It can, for example, be used in the form of wire of any cross-sectional shape; thin, flat strips; or tubes of any cross-sectional shape. The wire form is a preferred embodiment and, for reasons of convenience, much of the following description will be given in terms of its use. However, it will be understood that similar results are obtained with other elongated shapes as indicated above. The term "wire," as employed in this specification and claims, refers to elongated metal filaments which are not necessarily circular in cross-section but which can also be of other cross-sectional shapes, such a rectangular, oval, or the like. The term "exothermic" will be employed as convenient phraseology to define the reactive nature and composition of the metallic member which has been described in detail above.

Figure 2:
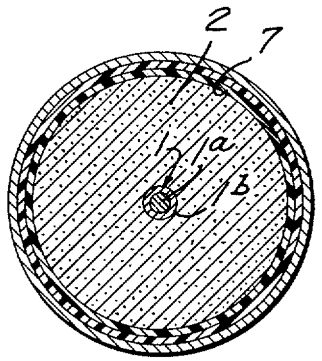
FIG. 2 is a cross-section taken along lines 2—2 of FIG. 1A.

FIG. 1 illustrates diagrammatically the burning phenomenon which occurs when a continuous exothermic wire 1 is embedded in end-burning propellent grain 2 and positioned normal to the initial ignition surface 3. For illustrative purposes, the propellent grain is shown in the combustion chamber 4 of rocket motor 5 provided with restricted nozzle 6. The end-burning grain is inhibited on its lateral surfaces by inhibitor coating 7 and on its forward end by plastic cement bonding 8. The entire surface of the wire is embedded in intimate, gas-sealing contact with the propellent matrix, except for end 9, which is exposed at the ignition surface. The exothermic wire comprises a core 1_a_ made of a metal such as Al, Mg, or Zn, clad with sheath 1_b_ of a metal, such as Pt or Pd, as shown in FIG. 2.

In FIG. 1A, the grain has just been ignited. In FIG. 1B, the burning surface has regenerated at the normal burning rate of the propellent matrix until a portion of wire 1 protrudes beyond the burning surface into the hot combustion gases. The exposed, protruding portion of the wire is heated to the temperature which initiates the exothermic reaction between the core and sheath metal portions of the wire. This exothermic reaction then propagates rapidly down the wire and, as it progresses, heats the propellent matrix adjacent to it and to the burning surface. Burning of the matrix then proceeds rapidly along the wire, thereby forming a recess 10 in the burning surface with the exothermically reacting wire at the apex, as shown in FIG. 1C with consequent large increase in burning surface area. At equilibrium burning, the angle subtended by the equilibrium burning surface and the wire becomes established, as shown in FIG. 1D, at a value which remains constant so long as there is no variation in composition of the matrix or in size, shape, or composition of the exothermic wire, these being factors which influence the burning rate. The higher the rate of burning along the wire, the more acute is the subtended angle, the deeper the recess, and the larger the burning surface area.

Intimate, gas-sealing contact between the wire surface and the propellent matrix is essential to produce the aforedescribed burning surface phenomenon, since any spacing results only in the establishment of an exposed surface in the interior of the grain which ignites and then burns progressively away from the wire in an outward direction normal to the perforation and to the wire at the normal linear burning rate of the propellent matrix.

Before the flame actively propages along the exothermic wire, a short length of metal must protrude into the burning zone, produced by ignition of the initial burning surface, in order that it be heated to a sufficiently high temperature to initiate the exothermic wire reaction. The length of protrusion varies somewhat with different reactive metal combinations. For effective action, therefore, the exothermic metal member must be of sufficient length both to provide for the initial exposure into the flame zone and for propagation of the flame for some distance into the unburned propellent in which it is embedded. In general, the minimum length of the exothermic metal member required to achieve an appreciable increase in mass burning rate is about 0.05 to 0.1 inch, and, preferably, about 0.2 inch.

The propellent matrix can be any suitable self-oxidant composition which, upon ignition, burns to produce propulsive gases, such as CO, $CO_2$, $H_2$, and $H_2O$. By "self-oxidant" is meant a composition which contains within itself an oxidizing component, such as oxygen, available for combustion of a fuel component of the composition. The propellent matrix can be, for example, of the double base type, such as nitrocellulose gelatinized with nitroglycerine, or of the composite type, such as a mixture of an organic fuel and a finely divided inorganic, solid oxidizer.

The matrix can be a conventional solid propellant or a plastic semi-solid. Cohesive, shape-retentive monopropellent compositions, which are characterized as plastic or semi-solid because they flow at ambient or normal temperatures under moderate stress or pressure, can be loaded into the combustion chamber of a gas-generating device or rocket motor where they function as end-burning grains. Such plastic monopropellent compositions generally comprise a stable dispersion of a finely-divided, insoluble, solid, inorganic oxidizer in a continuous matrix of an oxidizable organic liquid fuel. The physical properties of the plastic monopropellent, in terms of shape-retentive cohesiveness, tensile strength, and thixotropy, can be improved by addition of a gelling agent or by using a liquid vehicle of substantial intrinsic viscosity, such as a liquid organic polymer. An example of a semi-solid monopropellent composition suitable for use as an end-burning grain is one consisting of 75% $NH_4ClO_4$, 24% dibutyl sebacate, 1% polyvinyl chloride (gelling agent), and 0.1% wetting agent, the percentages being by weight. The plastic propellent can also be a double-base composition of suitable consistency, such as nitrocellulose plasticized with nitroglycerine. In general, the compositions should have a minimum tensile strength of about 0.03 p.s.i. and a maximum apparent viscosity at ambient temperature, as measured by its flow through a circular tube, of about 150,000 poise. The advantages of such semi-solid grains, as compared with solid grains for some applications, stems from the fact that the former require no curing and remain free from fissures and cracks even at low environmental temperatures.

The exothermic metal member increases the effective burning rate of the propellent grain to a degree which is very substantially higher than that obtainable with a bare metal conductor which functions solely by virtue of its thermal conductivity. The exothermic metal member also possesses the unique and unexpected property of maintaining such high burning rates accompanied by a reduced sensitivity to pressure over a much wider range of pressure, including pressures, in some cases, as low as 100 p.s.i., than has hitherto been possible.

EXAMPLE 1

Figure 3:
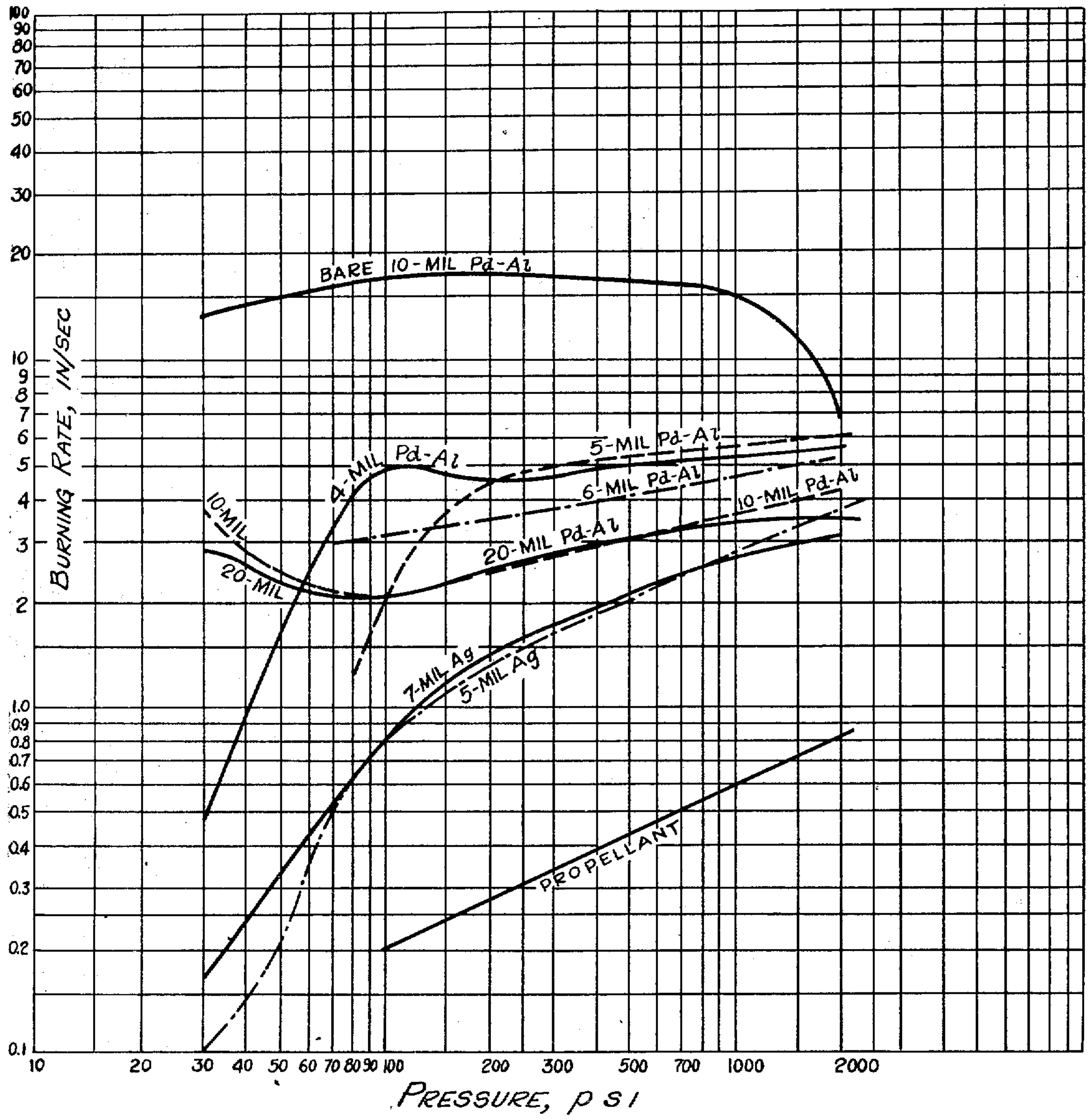
FIG. 3 is a graph which presents comparative experimental ballistic data obtained with various test propellent grains.

Ballistic test data obtained by burning propellent grains containing embedded exothermic metal wires are summarized graphically in FIG. 3.

The test grains, in all cases, were end-burning, with a continuous exothermic wire embedded normal to the initial ignition surface substantially as shown in FIG. 1. The matrix composition was as follows:

| | Parts by weight |
|---|---|
| Ammonium perchlorate | 21.03 |
| Polyvinyl chloride | 8.44 |
| Dibutyl sebacate | 10.23 |
| Wetting agent | 0.25 |
| Carbon black | 0.05 |

The exothermic metal member was a clad wire, the core being aluminum and the cladding sheath being palladium. The ratio of the Pd to Al by volume was 53:47. Reaction is initiated in such wires at a temperature of about 650° C. Wires of different diameter were tested to determine the effect of varying this parameter on burning rate. For purposes of comparison, tests were made with grains of the same composition without an embedded metal wire and with 5- and 7-mill silver wires. Silver was selected for the comparison because its high thermal diffusivity makes it one of the most effective of the metals for increasing burning rate by heat conduction alone. The 5- and 7-mil diameters are also very nearly optimum for ballistic properties in terms of burning rate and pressure exponent. The graph of FIG. 3 also includes a burning rate versus pressure curve for a 10-mil exothermic wire of the same composition as those employed in the propellant tests. This wire was not embedded in propellant, but was heated at one end to reaction temperature at different pressures in a nitrogen atmosphere, and the exothermic reaction rate along the wire measured. All tests were run at ambient propellant grain temperatures of 70° F. except for the exothermic wire alone, which was at an ambient temperature of 75° F.

The graph of FIG. 3 and the following table show the enormous increase in effective burning rate over a wide range of pressure obtained with the exothermic Pd-Al wires as compared with the propellant matrix alone and with an embedded Ag wire.

TABLE I

| Grain | Burning rate in./sec., 100 p.s.i. | Percent incr. over matrix | Burning rate in./sec., 200 p.s.i. | Percent incr. over matrix | Burning rate in./sec., 1,000 p.s.i. | Percent incr. over matrix |
|---|---|---|---|---|---|---|
| No wire | 0.2 | | 0.28 | | .59 | |
| 5-mil Ag | 0.78 | 290 | 1.3 | 394 | 2.75 | 366 |
| 7-mil Ag | 0.78 | 290 | 1.4 | 400 | 2.70 | 357 |
| 4-mil Pd-Al | 4.9 | 2,350 | 4.6 | 1,540 | 5.2 | 781 |
| 5-mil Pd-Al | 2.0 | 900 | 4.5 | 1,507 | 5.6 | 849 |
| 6-mil Pd-Al | 3.1 | 1,450 | 3.5 | 1,150 | 4.6 | 680 |
| 10-mil Pd-Al | 2.2 | 1,000 | 2.5 | 792 | 3.7 | 527 |
| 20-mil Pd-Al | 2.2 | 1,000 | 2.6 | 792 | 3.3 | 459 |

The exceedingly high burning rates obtained with the exothermic metal at combustion chamber pressures as low as 100 and 200 p.s.i. makes it possible to use end-burning grains, with their important high loading density and strength advantages, in high performance rockets at substantially lower combustion chamber pressures and over a wider range of pressures than has heretofore been possible.

Another important advantage of the exothermic metal member is the reduced sensitivity of burning rate to change in pressure which it imparts to the propellant grain over a wide range of operating pressures. This improves rocket control, minimizes the marginal strength requirements for the rocket motor casing needed to provide for possible unscheduled increases in burning rate, with consequent decrease in dead weight, and reduces the hazard of motor explosion. The reduced pressure sensitivity is graphically illustrated in the burning rate versus pressure curves in FIG. 3, which shows the marked flattening of the curves over a wide pressure range with the slope approaching zero. By comparison, the slopes of the curves for the grain containing Ag wire and no wire are substantially steeper throughout the 200 to 2000 p.s.i. pressure range. This is also shown in Table II, which summarizes the pressure exponents of the various test grains at different pressures. The subscript number following the symbol $n$ indicates the pressure in p.s.i.

TABLE II

| Grain | Pressure exponent |
|---|---|
| No wire | $n_{100}$ 0.52 |
| | $n_{2,000}$ 0.52 |
| 5-mil Ag | $n_{100}$ 0.95 |
| | $n_{1,000}$ 0.42 |
| | $n_{2,000}$ 0.42 |
| 7-mil Ag | $n_{200}$ 0.65 |
| | $n_{1,000}$ 0.27 |
| | $n_{2,000}$ 0.22 |
| 4-mil Pd-Al | $n_{300}$ 0.09 |
| | $n_{2,000}$ 0.09 |
| 5-mil Pd-Al | $n_{300}$ 0.08 |
| | $n_{2,000}$ 0.07 |
| 6-mil Pd-Al | $n_{100}$ 0.20 |
| | $n_{2,000}$ 0.20 |
| 10-mil Pd-Al | $n_{200}$ 0.29 |
| | $n_{2,000}$ 0.23 |
| 20-mil Pd-Al | $n_{150}$ 0.29 |
| | $n_{2,000}$ 0.03 |

The burning rate of the bare, exothermic wire is considerably higher than its burning rate when embedded in a propellant grain. The burning rate of the 10-mil Pd-Al wire in a nitrogen atmosphere, for example, is 18 ft./sec. at 100 p.s.i. and 15.0 ft./sec. at 1000 p.s.i., as shown in FIG. 3. The reduced burning rates of the embedded exothermic wires is believed to be due to conduction of heat away from the wire by the propellant matrix, thereby reducing its temperature and its reaction rate. The drop in burning rate of the bare 10-mil Pd-Al wire above 1000 p.s.i. is probably due to the increased heat conductivity of the nitrogen at such high pressures.

The variation in burning rate obtained with the embedded exothermic wires of the same composition but different diameter, as shown by the data presented above, is also believed to be a function of the rate of heat transfer both down the wire and away from the wire and this, in turn, is a function of the ratio of volume of the exothermic metal member to its exposed surface area, or cross-sectional area at any given point to its perimeter at that point. This phenomenon is highly advantageous, since it makes possible the formulation of a propellant grain having the particular burning rate at certain operating pressures within a wide range required for a particular rocket application, by proper selection of an exothermic metal member of suitable size. Variation of the composition of the exothermic metal member, both by varying the ratio of the reactive metals each to the other and by using different reactive metal combinations, provides another means for tailoring the burning rate of the propellant grain to the desired level. Different mass burning rates along exothermic metal wires of different size or different composition are manifested by different equilibrium cone angles. The higher the burning rate along the wire, the more acute is the angle at the apex and the larger is the burning surface area.

The thickness of the exothermic metal member is not critical since propagation of the exothermic reaction along its length induces an increase in mass burning rate of the grain. One of the practical considerations which may determine, to some extent, the thickness of the exothermic metal member, is the fact that its reaction products are not gaseous so that, if introduced in excessive amounts, it may decrease the gas-generating potential of the propellant. From this point of view, a maximum thickness of about 0.1 inch in at least one cross-sectional dimension will probably be desirable in most cases.

EXAMPLE 2

| | Parts by weight |
|---|---|
| Ammonium perchlorate | 58.90 |
| Polyvinyl chloride | 8.62 |
| Dioctyl adipate | 10.79 |
| Stabilizer | 0.34 |
| Wetting agent | 0.25 |
| Aluminum powder (5 micron) | 21.10 |

Figure 4:
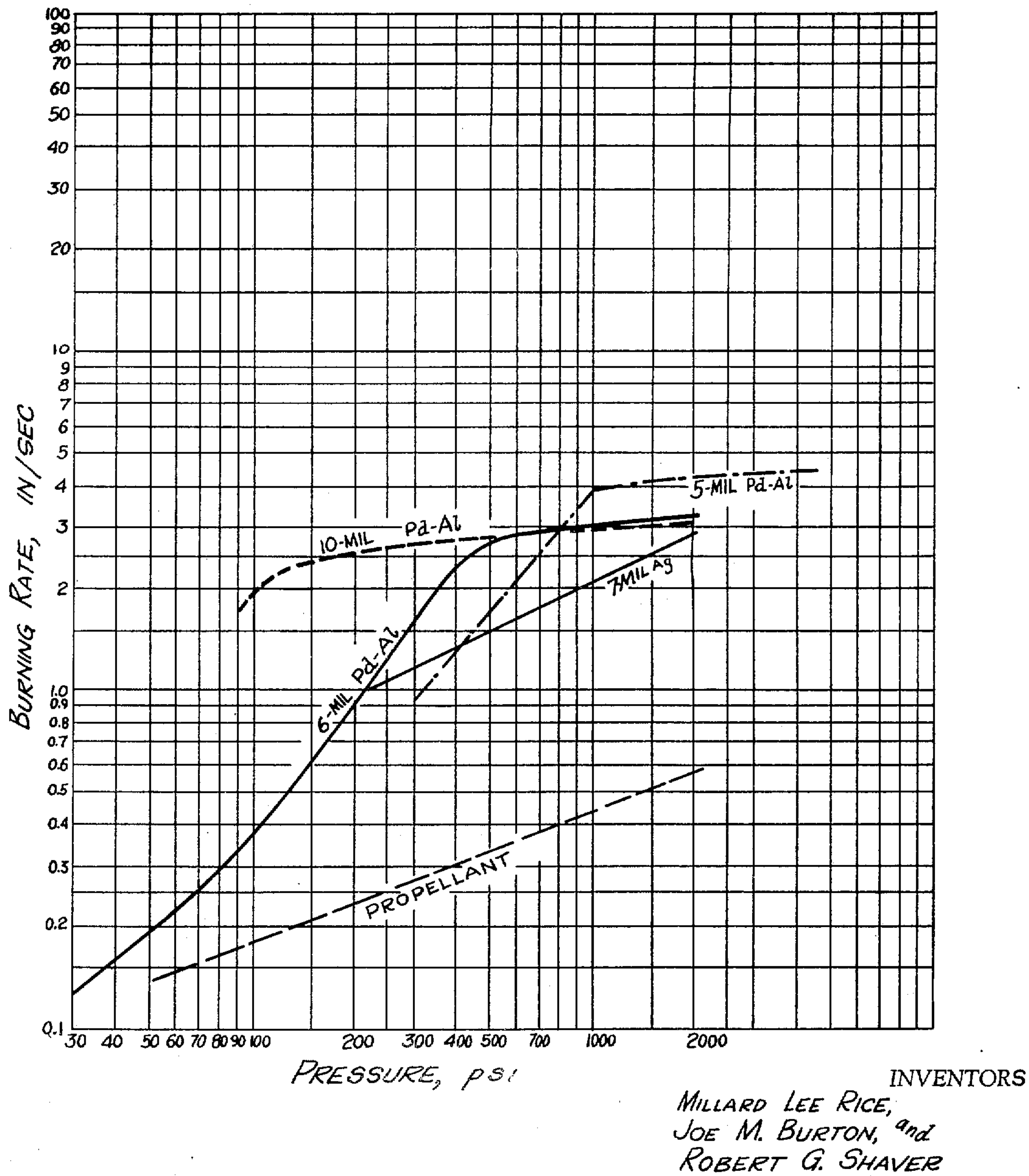
FIG. 4 is a graph presenting ballistic data obtained with propellent grains of different matrix composition from that employed in the tests of FIG. 3.

FIG. 4 and Tables III and IV summarize burning rate and pressure exponent results obtained.

TABLE III

| Grain | B.R. in./sec., 100 p.s.i. | Percent incr. over matrix | B.R. in./sec., 500 p.s.i. | Percent incr. over matrix | B.R. in./sec., 1,000 p.s.i. | Percent incr. over matrix |
|---|---|---|---|---|---|---|
| No wire | 0.18 | | 0.34 | | 0.44 | |
| 7-mil Ag | | | 1.5 | 222 | 2.10 | 377 |
| 5-mil Pd-Al | | | 1.7 | 400 | 3.9 | 785 |
| 6-mil Pd-Al | 0.39 | 116 | 2.8 | 723 | 3.1 | 605 |
| 10-mil Pd-Al | 2.0 | 1,010 | 2.9 | 752 | 3.0 | 582 |

TABLE IV

| Grain | Pressure | Exponent |
|---|---|---|
| No wire | $n_{100}$ | 0.38 |
| | $n_{500}$ | 0.38 |
| | $n_{1,000}$ | 0.38 |
| | $n_{2,000}$ | 0.38 |
| 7-mil Ag | $n_{500}$ | 0.49 |
| | $n_{1,000}$ | 0.49 |
| | $n_{2,000}$ | 0.49 |
| 5-mil Pd-Al | $n_{1,000}$ | 0.17 |
| | $n_{2,000}$ | 0.17 |
| 6-mil Pd-Al | $n_{500}$ | 0.45 |
| | $n_{600}$ | 0.17 |
| | $n_{1,000}$ | 0.1 |
| | $n_{2,000}$ | 0.1 |
| 10-mil Pd-Al | $n_{200}$ | 0.17 |
| | $n_{500}$ | 0.08 |
| | $n_{1,000}$ | 0.07 |
| | $n_{2,000}$ | 0.07 |

As in the case of the propellent of Example 1, which contained no metal fuel component, the exothermic wires greatly increased mass burning rate. Flattening of the burning rate vs. pressure curves occurred at higher pressures, probably because of the higher thermal diffusivity of the metallized matrix. However, at the point of flattening, sensitivity of burning rate to pressure approached zero over a wide range of pressure. It will be noted that by proper selection of the thickness of the exothermic metal member, e.g., the 10-mil wire, exceedingly high, reliable burning rates can be obtained at pressures as low as 100 p.s.i.

EXAMPLE 3

Three end-burning propellent Grains, A, B, and C, were cast, each 2.46 in. in diameter and 19 in. long, and containing 7 continuous, embedded, exotheric Pd-Al wires, positioned in spaced relationship normal to the initial ignition surface. The grains were inserted in rocket motors and static fired.

(A) The propellent matrix composition of Grain A was that described in Example 1 and the Pd-Al wires were 5 mils in diameter. The grain burned at a rate of 5.19 in./sec. at an average chamber pressure of 814 p.s.i.

(B) The propellent matrix composition of Grain B was the same as that of A but the wires were 6 mils in diameter. Burning rate was 4.88 in./sec. at an average chamber pressure of 787 p.s.i.

(C) The propellent matrix composition was the same as that described in Example 2 and the Pd-Al wires were 10 mils in diameter. Burning rate was 3.34 in./sec. at an average chamber pressure of 844 p.s.i.

Figure 5:
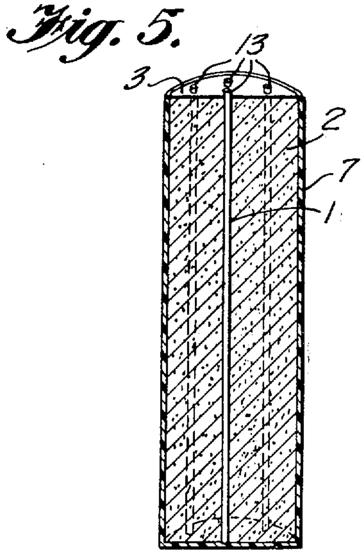
FIG. 5 is a sectional perspective showing an end-burning grain containing a plurality of continuous exothermic metal wires.
Figure 6:
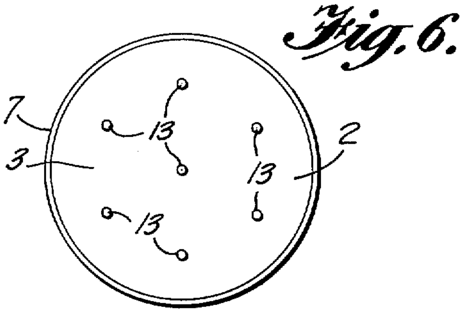
FIG. 6 is a plan view of the grain of FIG. 5.

In many cases, particularly where the propellent grain has a relatively large cross-sectional area, it is desirable to embed a plurality of continuous exothermic wires (or otherwise shaped elongated exothermic metal members) spaced from each other and positioned normal to the initial ignition surface, as shown in FIGS. 5 and 6. If a grain, which is short relative to its width, contains only a single wire, such as shown in FIG. 1, the peripheral portion of unburned propellant remaining when burning has progressed the full length of wire may be considerably larger than desirable. This can be avoided by introducing a plurality of wires as shown in FIGS. 5 and 6.

It is frequently desirable to achieve equilibrium, namely the point at which the recessed burning surface area and, consequently, the mass rate of gas evolution, becomes constant, as quickly as possible. The use of a plurality of exothermic wires, as shown in FIG. 5, greatly increases the rapidity with which the equilibrium burning surface can be established. In the case of a single wire, the depth of the coned recess, and, therefore, the burning surface area continues to increase until the flaring end of the cone intersects the peripheral edge of the grain, at which point equilibrium is established, or until burning reaches the end of the wire, as, for example, in the case of a grain which is short relative to its width. The mass rate of gas evolution continues to increase until the surface area of the cone becomes constant. Such high progressivity can be advantageous for some applications, but not where rapid establishment of a constant burning surface is desirable.

Where a plurality of continuous exothermic wires are used, the recessed cones incident to each wire soon intersect at their flaring ends and the equilibrium burning surface area is more quickly reached. Although the equilibrium cone angle is the same as for a single wire, the depth of the recessed cones is shorter in the case of a plurality of wires, so that overall burning surface area is not in actuality increased.

Figure 7:
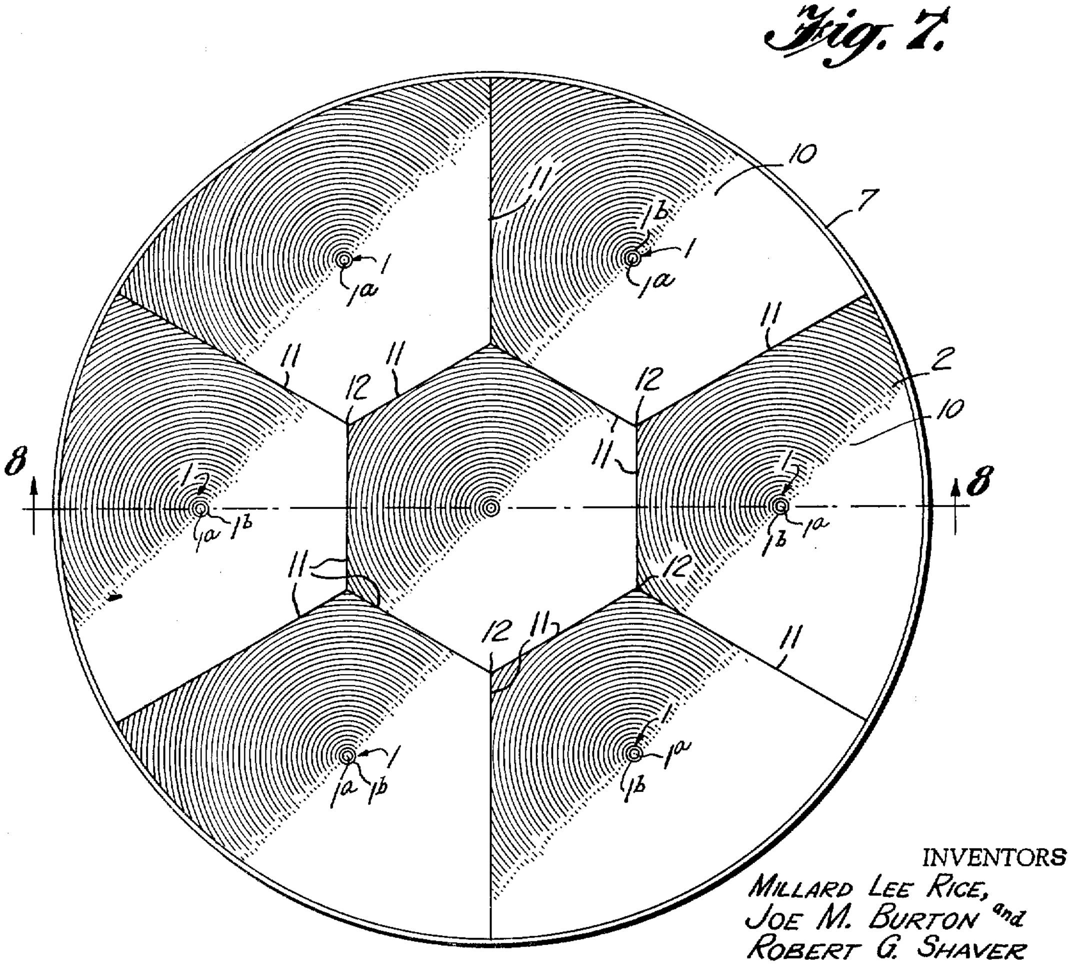
FIG. 7 is a plan view showing diagrammatically the burning surface at equilibrium of the grain of FIG. 5.
Figure 8:
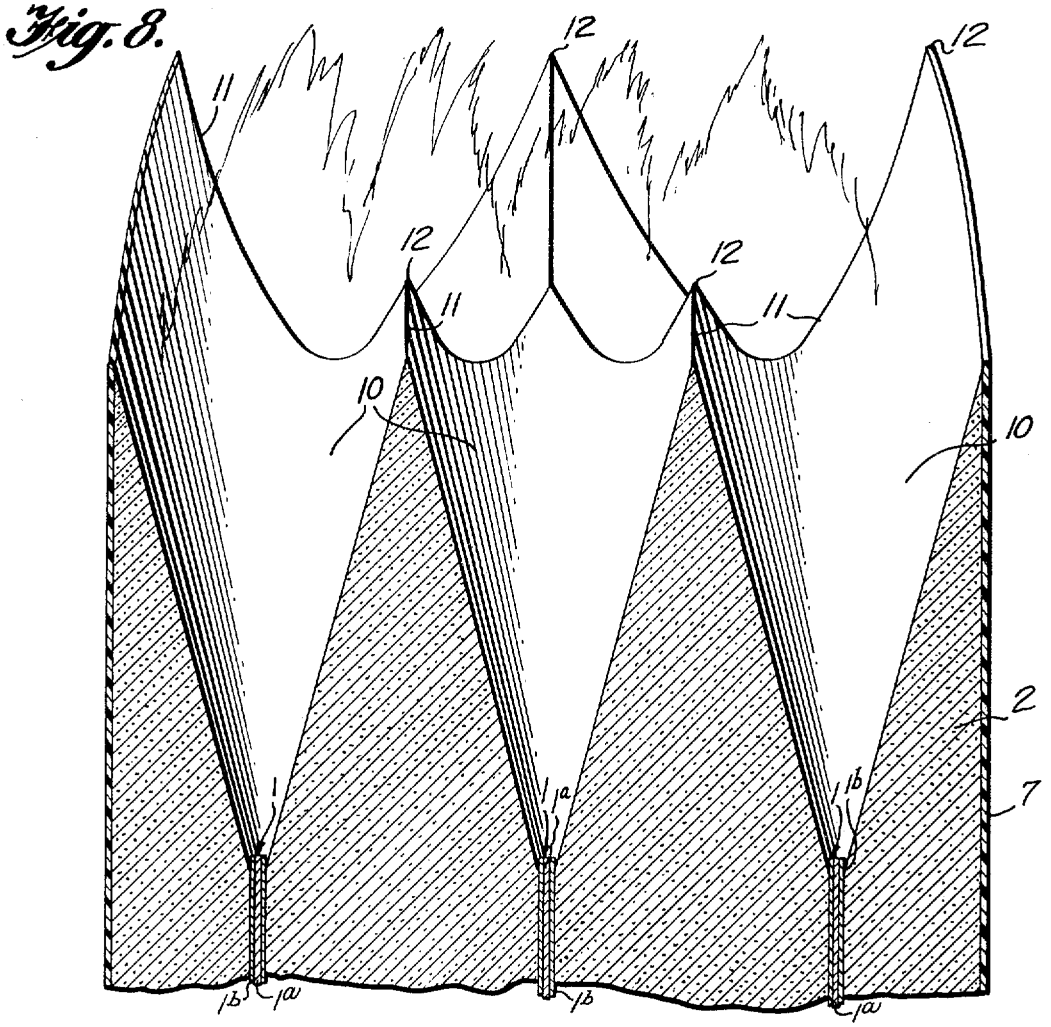
FIG. 8 is a cross-sectional view taken along lines 8—8 of FIG. 7.

FIGS. 7 and 8 show diagrammatically the burning surface at equilibrium of the grain of FIG. 5 produced after initial ignition of surface 3 and after burning has progressed along the 7 spaced wires 1, with concomitant recessing until the equilibrium cone angle has been reached. The cones 10 flare out from the wires 1 exposed at the apex of each and intersect each other and the periphery of the grain to form inwardly curved ridges 11 and apical points 12.

The equilibrium state can also be established more rapidly by protrusion of the exothermic wires for a short distance above the initial ignition surface, as illustrated by wire ends 13 in FIGS. 5 and 6. This expedient exposes a length of wire to the hot combustion gases immediately after ignition of the grain, which promotes more rapid initiation of the exothermic metal wire reaction.

Figure 9:
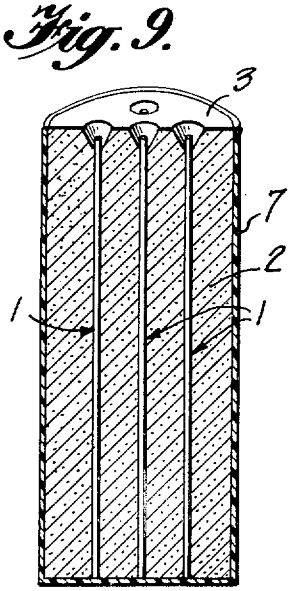
FIG. 9 is a sectional perspective of another embodiment of our invention.

Recessing the ignition surface adjacent to the exothermic wires, as, for example, in the form of cones, with the wire exposed at the apex, as shown in FIG. 9, also hastens establishment of the equilibrium burning surface. Any degree of prerecessing which brings the initial burning surface into a closer approximation of the equilibrium burning surface results in more rapid establishment of equilibrium.

Figure 10:
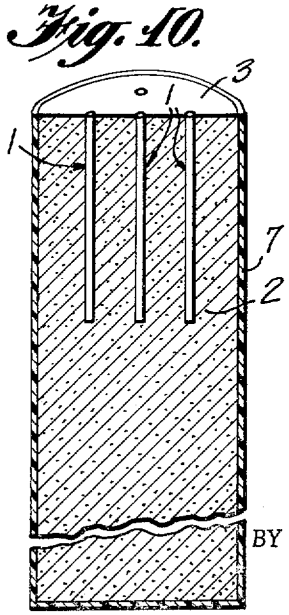
FIGS. 10 and 11 are sectional perspectives showing still other modifications.
Figure 11:
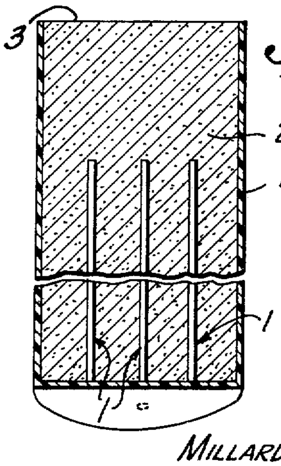

For many gas generating applications, it is essential that a high burning rate be maintained throughout grain combustion. This requirement can be satisfied by extending the continuous exothermic metal member for substantially the entire distance of flame propagation as shown in FIGS. 1 and 5. There are some cases, however, where a very high impulse is required for only a portion of the combustion cycle as, for example, until a propelled object is airborne, after which the rate of gas production can be reduced. Such a requirement can be met by limiting the length of the exothermic metal member, as shown in FIG. 10. After burning has proceeded along the full length of the metal, combustion then continues at the normal linear burning rate of the propellant to the end of the grain. In other applications, it may be desirable to progress from a relatively low initial impulse to a high impulse. In such case, the elongated exothermic metal member can be embedded in the grain at a predetermined point spaced from the initial ignition surface as shown in FIG. 11.

As aforementioned, the exothermic metal member, though conveniently used in the form of a wire, can also be employed in the form of elongated, continuous strips, which can be flat or bent into other desired shapes, such as a V-shape or tube. The effect on mass burning rate is similar to that obtained with wires, with recessing of the burning surface occurring along the reacting exothermic metal member regardless of shape. The burning surface along elongated exothermic metal members which are substantially wider than they are thick, assumes the configuration of a trough of V-shaped cross-section rather than the cone incident to a wire. The various expedients for hastening the establishment of the equilibrium burning surface, discussed above in connection with the use of wires, can be employed, such as use of a plurality of the elongated strips or tubes, prerecessing, and protrusion from the initial ignition surface.

Figure 12:
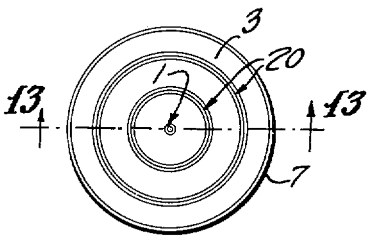
FIG. 12 is a plan view of a propellent grain containing embedded therein a continuous, axial exothermic wire and concentric exothermic metal tubes.
Figure 13:
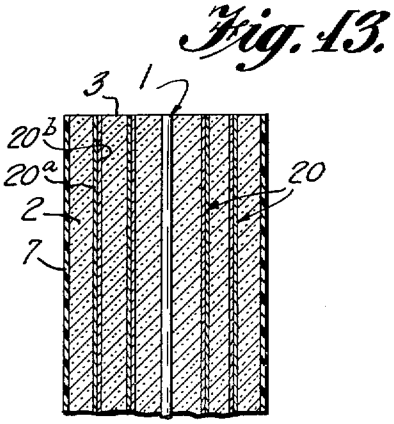
FIG. 13 is a cross-sectional view taken along lines 13—13 of FIG. 12.

FIGS. 12 and 13 show a concentric arrangement of tubular exothermic metal members 20, consisting of layer

20*a* of a Group A metal, such as Pd, joined to layer 20*b* of a Group B metal, such as Al, and an axial exothermic wire 1 embedded in the matrix of the propellent grain normal to the initial ignition surface 3. The exothermic metal members can also be embedded in the propellent grain matrix as a bundle of individual, longitudinally disposed tubes 21, as shown in FIGS. 14 and 15.

FIGS. 16, 17, and 17A show, embedded in the matrix of the propellent grain, an exothermic metal member in the form of a skeletal framework 22, consisting of two exothermically reactive metal layers 22*a* and 22*b*, forming longitudinal tubular passages 23 normal to initial ignition surface 3, the tubular passages in this case being of hexagonal cross section.

Tubular metal members such as shown in FIGS. 12–17 have the advantage of structurally reinforcing the propellent grain. They are particularly advantageous as a reinforcing element in conjunction with the plastic or semi-solid propellants described above, which tend to deform under pressure.

Although the preceding description has been in terms of solid, end-burning grains, our invention can also be applied very advantageously to other types of propellent grains, such as perforated grains. The incorporation of the exothermic metal members into the matrix of a perforated grain results in a propellant which burns with extreme rapidity because of the combination of the increased mass burning rate along the exothermic metal and the large initial burning surface provided by the perforations. The elongated, exothermic metal member can be continuous or can be dispersed through the matrix in the form of short lengths.

The continuous exothermic metal elements can be positioned in the matrix of the perforated grain in a manner most suitable for the particular application. For example, in FIGS. 18 and 19, the embedded, exothermic wires 1 radiate out from the central perforation 24, which provides an uninhibited initial ignition surface. Lateral surface 25 is also an uninhibited ignition surface so that the flame rapidly propagates along the wires in a radial plane both from the outside in and from the inside out.

In FIGS. 20 and 21, the exothermic metal members are in the form of strips 26, which radiate from the interior ignition surface formed by longitudinal perforation 24 to the lateral, exterior ignition surface 25, and extend the full length of the propellent grain. Ends 27 of the grain are coated with inhibitor 7 to prevent ignition of the propellant and the exothermic metal strip at these surfaces.

FIGS. 22 and 23 show an end-burning cylindrical grain with central perforation 24 and a plurality of continuous exothermic metal wires 1 which are normal to the end-burning surfaces 3 and 3' and run the length of the grain. If both the exterior surface 25 and the surface exposed by the central perforation 24 are inhibited, the flame propagates rapidly along the wires from both ends of the grain. If the central perforation surface is uninhibited, the grain also burns outwardly from the central perforation, but propagation of this flame front is considerably slower because of the absence of wire in the direction of flame propagation. Such grains are particularly suitable for some rocket applications, since it makes possible venting of combustion gases produced at the end of the grain adjacent to the closed end of the rocket chamber through the central perforation.

The effective increase in burning rate obtained with the embedded exothermic metal member is influenced to some extent by the thermal diffusivity of the propellant matrix. Matrices of higher thermal diffusivity, such as propellants containing powdered metal fuel components, tend to reduce somewhat the effect of the exothermic metal member. This action is generally more pronounced at lower operating pressures and with metal members of lesser thicknesses or diameters. We have found that this effect can be counteracted by coating the exothermic metal member with a material having a lower thermal diffusivity than that of the propellant grain matrix. The coating acts, in effect, as an insulator reducing the rate of heat loss from the exothermic metal member, thereby increasing its rate of reaction along its length.

The coating can be substantially any solid composition which is compatible with the propellant matrix. It should be applied in such manner that the coating adheres in intimate contact with the metal. After introduction of the coated metal into the propellant grain matrix, the coating must be in intimate contact throughout with the propellant matrix for the same reasons discussed above in connection with the bare exothermic metal members.

The insulator coating can, like the propellant matrix, be self-oxidant and can comprise compositions similar to those aforedescribed as propellant compositions, so long as it is of lesser thermal diffusivity than the propellant matrix in which it is embedded. It can, for example, be of composition similar to that of the grain matrix except for omission of a metal fuel component.

When a self-oxidant coating is used, the propellant grain burning rate tends to approach that of a grain in which the uncoated exothermic metal member is embedded in a propellent grain matrix having the composition of the coating. By proper formulation of the coating, therefore, the burning rate can be adjusted to any desired level within a broad range. This imparts an additional advantageous element of flexibility to the system.

The insulator coating composition can also be inert, namely a material which does not contain within itself oxygen available for self-combustion. The burning rates obtained with an inert coating are generally not quite as high as those which can be obtained with self-oxidant coatings. However, as in the case of the self-oxidant coatings, the inert coatings provide for additional advantageous flexibility in the control of burning rate, as, for example, by suitable choice of coating composition and thickness.

Coatings which comprise a polymer, at least in part, are especially suitable because of their good insulating properties and their usually excellent film forming ability. Such polymers include, for example, cellulose esters such as cellulose acetate and other fatty acid esters, cellulose ethers such as ethyl cellulose, vinyl polymers such as polyvinyl chloride and polyvinyl acetate, phenolic resins such as the phenol-aldehydes, urea-formaldehydes, polyamides, natural and synthetic rubber, natural resins, silicones such as dimethyl siloxane, and the like.

In the case of the synthetic polymers, it is frequently desirable to incorporate a non-volatile organic plasticizer to improve the workability and film-forming properties of the plastic and the physical properties of the coating in terms, for example, of reduced brittleness and increased adherency. An organic plasticizer which is compatible with the polymer and imparts the desired physical properties can be used. Plasticizers which are suitable for the various polymers include, for example, phthalates such as dimethyl phthalate, diethyl phthalate, dibutyl phthalate, dioctyl phthalate, dimethoxyethyl phthalate, diethoxyethyl phthalate, methyl- and ethyl-phthalyl glycolate, butyl phthalyl butyl glycolate, sebacates such as dibutyl and dioctyl sebacate, adipates such as dioctyl adipate, acetates such as glyceryl triacetate, butylene glycol diacetate and cresyl glyceryl diacetate, higher fatty acid glycol esters, citrates such as triethyl citrate and acetyl triethyl citrate, organic phosphate esters such as tributoxyethyl phosphate and trimethyl phosphate, maleates such as methyl maleate, propionates such as diethylene glycol propionate, and the like.

Finely divided solids, such as silica, bentonite, $CaCO_3$, asbestos and the like, can be incorporated into the coating composition to influence its insulating properties.

The various coating compositions can be prepared and applied to the exothermic metal member in any desired manner as, for example, by dipping or spraying. In some cases it may be desirable to fluidify the coating prior to application by addition of a volatile solvent which is removed by volatilization after the coating is applied. In some instances, it will be necessary to heat the coated metal to polymerize applied monomeric or partially cured polymeric materials, or to dissolve the polymer in plasticizer to form a solid gel. Any required heating operation should, of course, be carried out at temperatures below the ignition temperature of a self-oxidant coating or of the exothermic metal.

EXAMPLE 4

Tests were made, substantially as described in Example 1, to determine the effect of coating the exothermic metal wire prior to embedding it in the matrix with compositions of different thermal diffusivity from that of the matrix.

Composition of the matrix was as follows:

| | Parts by weight |
|---|---|
| Ammonium perchlorate | 59.90 |
| Polyvinyl chloride | 8.19 |
| Dioctyl phthalate | 10.56 |
| Wetting agent | 0.25 |
| Aluminum powder (5 micron) | 21.10 |

Table V summarizes burning rates obtained with no wire, an uncoated 4-mil Pd-Al wire (53:47 by volume), and the same wire coated with different compositions.

TABLE V

| Grain | Burning rate in./sec., 1,000 p.s.i. | Burning rate in./sec., 2,000 p.s.i. |
|---|---|---|
| No wire | 0.5 | 0.65 |
| Bare wire | 2.4 | 4.2 |
| Wire coated with A (1) | 4.8 | 5.2 |
| Wire coated with B (2) | 3.1 | 4.8 |

1 Self-oxidant coating having the composition of the propellent matrix of Example 1.
2 Polyvinyl chloride.

It will be noted from the above data that the self-oxidant Coating A, which has a lower thermal diffusivity than that of the matrix because of the absence of powdered metal in the former, very substantially increased mass burning rate, raising it to a level closely approaching that of the coating alone, as shown in FIG. 3 and Table I. The inert insulator coating also effected a substantial increase in burning rate.

FIGS. 24 and 25 illustrate an end-burning propellant grain having embedded therein longitudinally disposed coated exothermic metal wires 1 having coating 31 of lower thermal diffusivity than the grain matrix. Coating 31 can be self-oxidant or inert. Both types of coatings can be applied to exothermic metal members of any configuration, such as those shown in FIGS. 12, 14, and 16.

The embedded elongated, continuous, exothermic metal members can be employed not only to increase the mass burning rate of the grain as a whole, as shown, for example, in FIG. 1, or in part, as shown in FIGS. 10 and 11, to a predetermined level, but also to modulate the burning rate of the grain and, thereby, its thrust, in a predetermined manner as it burns. This is an exceedingly important advantage, which has hitherto been difficult to achieve in shaped propellent grains. It is well-known that one of the factors determining thrust at any given point in the burning cycle of a propellent grain is the area of burning surface at that point. Since a propellant grain, once made, is fixed in shape, any preprogrammed variation in thrust desired after ignition has required complex designing of the grain, as by perforation or lateral recessing, difficult expedients which are limited in their range of effectiveness, or by varying other factors affecting thrust, such as wasteful side dumping of some of the combustion gases or turning rocket motor nozzles to an angle which reduces the vector producing forward thrust.

Preprogrammed thrust modulation of end-burning, cylindrical grains of uniform cross-sectional diameter can be readily and simply achieved by embedding in the propellent matrix, in the manner aforedescribed, elongated exothermic metal members which vary along their length in the ratio of cross-sectional area to the perimeter of that area, either continuously along the length of the conductor or at predetermined spaced points. As disclosed above, the mass burning rate varies with changes in this ratio. This is illustrated in Examples 1 and 2 and the graphs of FIGS. 3 and 4, which present comparative experimental ballistic data for propellent grains containing exothermic wires of different diameter. The rate of change in burning rate with change in the exothermic metal dimension ratio is, of course, influenced by the composition both of the metal and the matrix.

The effect, at different combustion chamber pressures, of exothermic metal members of given composition, embedded in a particular propellant matrix, and having different ratios of cross-sectional area to perimeter, can readily be predetermined by routine testing. On the basis of such data, the elongated exothermic metal member can then be predesigned with varying ratios along its length, so that, when embedded in the grain matrix, it produces the desired modulation of burning rate and thrust as the grain burns. Such modulation can be in the direction either of increased or decreased thrust as required by the particular conditions of use.

The change in the ratio of cross-sectional area to perimeter can be accomplished in any suitable manner, as by increasing or decreasing the diameter of a round wire, flattening a portion of a wire of round, oval, or rectangular cross-section to different thicknesses, changing the thickness of the wall of a tubular exothermic metal member, and the like.

Except for the modulation effect, the exothermic metal members of varying dimension ratio function as do members of constant size and the various modifications described above for the latter are equally applicable to the former, including, for example,, the use of a single or plurality of the modulating exothermic metal members, protrusion at the ignition surface, prerecessing of the ignition surface, application in a variety of shapes, and use in propellent grains of various designs. Coating of the modulating exothermic metal members with a composition of lesser thermal diffusivity than that of the propellent matrix can also be effectively employed.

FIGS. 26 and 27 show a modulated end-burning grain containing an embedded exothermic wire 32 of circular cross-section and continuously increasing diameter in the direction away from initial ignition surface 3.

FIGS. 28 and 29 illustrate an end-burning propellent grain designed to provide preprogrammed stepped performance by means of exothermic metal member 33. In this case, portions **33*a*, 33*b*, and 33*c*** are each of a constant, circular cross-section, which increases progressively from portion to portion of the metal element along its length.

In the end-burning grain illustrated in FIGS. 30 and 31, the exothermic metal member 34 comprises a flattened ribbon portion **34*a* and portion 34*b* of circular cross-section. Portion 34*a* has a smaller ratio of cross-sectional area to perimeter than does portion 34*b***.

Thrust of the grain can also be modulated by varying the ratio of the reacting exothermic metal components at predetermined spaced points along the exothermic wire member without varying the size dimensions. Since variation in the relative proportions of the metals varies the intensity of reaction and, therefore, the temperature produced by reaction along the wire, this expedient can be employed to vary burning rate along the wire as desired.

EXAMPLE 5

Tests were made, substantially as described in Example 1, to determine the effect of varying the proportion of Pd and Al in the exothermic wire. The propellent matrix had the same composition as that of Example 1. Two continuous, 5-mil Pd-Al wires were tested. In wire A, the ratio of Pd:Al was 53:47 parts by volume; in wire B the ratio was 64:36.

TABLE VI

| Grain | Burning rate in./sec., 1,000 p.s.i. | Burning rate in./sec., 2,000 p.si. |
|---|---|---|
| A | 5.6 | 6.0 |
| B | 3.5 | 4.3 |

Still another way of programming the thrust of the propellant grain is by embedding in the grain a continuous elongated metal member comprising an exothermic metal along at least one predetermined portion of its length and an inert metal heat conductor, such as Ag, Cu, or the like, along another predetermined portion of its length. This expedient has the advantage of broadening the range of thrust modulation which can be obtained. The portions of the different metals can be attached together in any suitable manner, as by soldering, and can be of varying shapes and cross-sectional dimension ratio, as aforedescribed.

The foregoing discussion has been primarily in terms of elongated exothermic metal members which are continuous in the direction of flame propagation of the grain. Substantial increases in mass burning rate can also be obtained by dispersing short lengths of exothermic metal wire in the propellent matrix. Dispersion of the wires can be accomplished, for example, by mixing the short lengths into the propellant formulation prior to loading and cure. The wires in grains prepared in this manner generally assume a more or less random pattern as shown in FIGS. 32 and 32*a* where exothermic metal wires 35 are embedded in the propellant matrix of grain 2. It will be noted that a substantial number of the randomly dispersed wires are at an angle, relative to the initial ignition surface 3, of less than 180°. For recessing of the burning surface of the grain along the wires, it is essential that a substantial number of the wires be at such an angle. Somewhat improved results, in terms of increased burning rate, can be achieved by orienting the dispersed short exothermic wires in the direction of flame propagation, namely substantially normal to the initial ignition surface, as shown in FIGS. 33 and 33*a*.

As aforedescribed, the wires dispersed in the propellent matrix must be at least about 0.05 inch long and preferably at least about 0.1 or 0.2 inch to provide sufficient length for initial exposure into the flame zone and burning surface propagation along the wire. In general, the longer the wire, the larger is the effective increase in burning rate. To some extent, wire lengths will be determined by the size of the grain. In the case of large grains, for example, wires 2 inches long or longer can be incorporated.

The amount of discontinuous wire introduced into the propellant matrix is not critical, although this is one of the factors which determines the specific increase in mass burning rate obtained. The addition of even a very small amount effects some increase. In many cases, it is desirable to add about 1% by weight of the propellant to obtain substantial results.

As aforementioned, the increase in effective burning rate obtained with the short, dispersed lengths of exothermic wire is not as great as that obtained with continuous exothermic metal members. The reason for this apparently stems from the fact that, in the case of the discontinuous wires, the flame, after the initial exposure of one end into the combustion zone required to initiate the exothermic metal reaction, propagates rapidly with recessing of the burning surface along each short length, but is slowed, substantially to the normal burning rate of the propellant matrix, when it must bridge the gap between the end of one wire and an adjacent wire. With a continuous exothermic metal element, the flame continues to propagate rapidly and uninterruptedly through the entire length of the desired burning distance.

Discontinuous exothermic wires dispersed in the propellent matrix can be very advantageously employed together with continuous exothermic metal members or even with continuous inert metal heat conductors, such as Ag or Cu, to give exceedingly high burning rates. In such case it may be desirable to coat the continuous exothermic metal member with an insulator coating of lesser thermal diffusivity than that of the propellent matrix containing the dispersed wire lengths.

We claim:

1. A propellent grain, said grain comprising a self-oxidant propellent matrix, the combustion of which generates propellent gases, and having at least one initial ignition surface, said matrix containing embedded therein an integral elongated, exothermically-reactive metal member, said metal member comprising at least two metals in intimate contact, which, upon heating, react together exothermically, said exothermic metal member being positioned substantially normal to the plane of said initial ignition surface of said grain and being continuously and longitudinally disposed in the direction of flame propagation of the grain, said exothermic metal member having a length within the body of the grain of at least about 0.2 inch and a maximum metal thickness of about 0.1 inch in at least one transverse direction, the entire surface of said length of said exothermic metal member being in intimate gas-sealing contact with the propellent matrix, the exothermic metal member, after ignition of said grain, reacting exothermically along its length, and the burning surface of said grain regenerating progressively along said exothermically reacting metal member and, in so doing, forming a recess which is substantially V-shaped in at least one plane with said exothermic metal member at the apex of said recess, thereby forming a recessed surface of substantially larger surface area than that of a plane burning surface, the exothermic metal member thereby serving to increase the mass burning rate and, thereby, the mass rate of gas generation of said propellant grain.

2. A propellant grain, said grain comprising a self-oxidant, propellent matrix, the combustion of which generates propellent gases, and having at least one initial ignition surface, said matrix containing embedded therein a plurality of integral elongated, exothermically-reactive metal members substantially spaced from each other in the plane transverse to the direction of flame propagation, said metal members each comprising at least two metals in intimate contact, which, upon heating, react together exothermically, said metal members being positioned substantially normal to the plane of said initial ignition surface and being continuously and longitudinally dispersed in the direction of flame propagation of the grain, said exothermic metal members having a length within the body of the grain of at least about 0.2 inch and a maximum metal thickness of about 0.1 inch in at least one transverse direction, the entire surface of said length of said exothermic metal members being in intimate gas-sealing contact with the propellent matrix, the exothermic wire members, after ignition of said grain, reacting exothermically along their lengths, and the burning surface of said grain regenerating progressively along said exothermically reacting metal members and, in so doing, forming a recess which is substantially V-shaped in at least one plane with each of said exothermic metal members at the apex of said recess, thereby forming a recessed surface of substantially larger surface area than that of a plane burning surface, said exothermic metal members being spaced sufficiently apart to permit said recessing of the burning surface, the exothermic metal members thereby serving to increase the mass burning rate and, thereby, the mass rate of gas generation of said propellent grain.

3. The propellant grain of claim 2 in which the exothermic metal members are continuous substantially throughout the distance of flame propagation.

4. The propellent grain of claim 2 in which the exothermic metal members comprise a plurality of metal wires.

5. The propellent grain of claim 1 in which the exothermic metal member forms a longitudinal tubular structure within the body of the grain.

6. The propellent grain of claim 1 in which one end of the exothermic metal member is exposed at said initial ignition surface of the grain.

7. The propellent grain of claim 6 in which said end is exposed in a recess in said initial ignition surface.

8. The propellent grain of claim 1 in which the exothermic metal member is longitudinally and continuously disposed for a predetermined distance in the direction of flame propagation of the grain.

9. The propellent grain of claim 1 in which the embedded elongated exothermic metal member varies in the ratio of its cross-sectional area to perimeter in predetermined manner along its length.

10. The propellent grain of claim 1 in which the elongated exothermic metal member has a coating of a solid composition of lower thermal diffusivity than that of the propellent grain matrix, and the entire surface of the coated exothermic metal member lying within the body of the propellent grain is in intimate gas-sealing contact with said matrix.

11. The propellent grain of claim 10 in which the coating composition is self-oxidant.

12. A propellent grain, said grain comprising a self-oxidant propellent matrix, the combusion of which generates propellent gases, and having at least one initial ignition surface, said matrix containing embedded and randomly dispersed therein a plurality of spaced, elongated, exothermically-reactive metal wires having a minimum length within the body of the grain of about 0.1 inch and a maximum diameter of about 0.1 inch, said metal wires each comprising at least two metals in intimate contact, which, upon heating, react together exothermically, the entire surface of said length of said exothermic metal wires being in intimate contact with the propellent matrix, a substantial number of said randomly dispersed wires being at an angle, relative to the plane of the initial ignition surface, which is substantially less than 180°, the exothermic wires, after ignition of said grain reacting exothermically along their lengths, and the burning surface of said grain regenerating progressively along said exothermically reacting wires positioned at said angle substantially less than 180°, and, in so doing, forming a recess which is substantially V-shaped in at least one plane with each of said exothermic wires at the apex of said recess, thereby forming a recessed surface of substantially larger surface area than that of a plane burning surface, said exothermic metal wires being spaced sufficiently apart to permit said recessing of the burning surface, the exothermic metal wires thereby serving to increase the mass burning rate and, thereby, the mass rate of gas generation of said propellent grain.

13. The propellent grain of claim 12 in which the exothermic metal wires have a coating of a solid composition of lower thermal diffusivity than that of the propellent grain matrix, and the entire surface of the coated exothermic metal wires lying within the body of the propellent grain is in intimate, gas-sealing contact with said matrix.

14. The propellent grain of claim 1 in which the elongated metal member comprises palladium and aluminum.

15. The propellent grain of claim 2 in which the elongated metal member comprises palladium and aluminum.

16. The propellent grain of claim 4 in which the elongated metal member comprises palladium and aluminum.

17. The propellent grain of claim 9 in which the elongated metal member comprises palladium and aluminum.

18. The propellent grain of claim 10 in which the elongated metal member comprises palladium and aluminum.

19. The propellent grain of claim 12 in which the elongated metal member comprises palladium and aluminum.

20. The propellent grain of claim 1 in which the embedded elongated exothermic metal member varies in the ratio of the exothermically reacting metals in predetermined manner along its length.

21. The propellent grain of claim 20 in which the elongated metal member comprises palladium and aluminum.

22. The propellent grain of claim 5 in which the exothermic metal member forms a plurality of tubular structures within the body of the grain.

23. The propellent grain of claim 1 in which said exothermically-reactive metal member comprises at least one Group A metal and at least one corresponding Group B metal, said Group A metals and corresponding Group B metals being as follows:

| Group A: | Group B |
|---|---|
| Pd | Al, Mg, Zn |
| Pt | Al, Mg, Zn |
| Al | Co, Fe, Ni, Sb, Ca, Cu, La, Li, Pr, Ti, Ce |
| Ni | Sn, Si |
| Mg | Ce, Al, Pr, La, Pb, Sn, Si |
| Si | Fe, Co |
| Zn | Ag, Cu |

24. The propellent grain of claim 2 in which said exothermically-reactive metal member comprises at least one Group A metal and at least one corresponding Group B metal, said Group A metals and corresponding Group B metals being as follows:

| Group A: | Group B |
|---|---|
| Pd | Al, Mg, Zn |
| Pt | Al, Mg, Zn |
| Al | Co, Fe, Ni, Sb, Ca, Cu, La, Li, Pr, Ti, Ce |
| Ni | Sn, Si |
| Mg | Ce, Al, Pr, La, Pb, Sn, Si |
| Si | Fe, Co |
| Zn | Ag, Cu |

25. The propellent grain of claim 12 in which said exothermically-reactive metal member comprises at least one Group A metal and at least one corresponding Group B metal, said Group A metals and corresponding Group B metals being as follows:

| Group A: | Group B |
|---|---|
| Pd | Al, Mg, Zn |
| Pt | Al, Mg, Zn |
| Al | Co, Fe, Ni, Sb, Ca, Cu, La, Li, Pr, Ti, Ce |
| Ni | Sn, Si |
| Mg | Ce, Al, Pr, La, Pb, Sn, Si |
| Si | Fe, Co |
| Zn | Ag, Cu |

References Cited

UNITED STATES PATENTS

| | | | |
|---|---|---|---|
| 2,131,353 | 9/1938 | Marsh | 102—98 |
| 2,637,274 | 5/1953 | Taylor | 102—98 |
| 2,799,987 | 7/1957 | Chandler | 60—35.6 |

ROBERT F. STAHL, Primary Examiner